(12) United States Patent
Deyab et al.

(10) Patent No.: US 9,292,483 B2
(45) Date of Patent: Mar. 22, 2016

(54) INTELLIGENT TEXT ANNOTATION

(75) Inventors: Mohamed Fathy Deyab, Cairo (EG);
Hisham Emal El-Din ElShishiny, Cairo (EG); Ahmed Ragheb, Cairo (EG);
Ahmed Mousaad Abdel Wanees, Cairo (EG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2386 days.

(21) Appl. No.: 12/146,119

(22) Filed: Jun. 25, 2008

(65) Prior Publication Data

US 2009/0019356 A1    Jan. 15, 2009

(30) Foreign Application Priority Data

Jul. 10, 2007  (EP) .................................. 07112113

(51) Int. Cl.
*G06F 17/00*  (2006.01)
*G06F 17/24*  (2006.01)
*G06F 17/27*  (2006.01)

(52) U.S. Cl.
CPC .......... *G06F 17/241* (2013.01); *G06F 17/2785* (2013.01)

(58) Field of Classification Search
CPC .................................................... G06F 17/241
USPC ........................................................ 715/230
See application file for complete search history.

(56) References Cited

U.S. PATENT DOCUMENTS

| 5,594,641 | A  | * | 1/1997 | Kaplan et al. | |
|---|---|---|---|---|---|
| 6,687,696 | B2 | * | 2/2004 | Hofmann et al. | |
| 6,745,161 | B1 | * | 6/2004 | Arnold et al. | 704/7 |
| 2004/0078190 | A1 | * | 4/2004 | Fass et al. | 704/7 |
| 2005/0108001 | A1 | * | 5/2005 | Aarskog | 704/10 |

FOREIGN PATENT DOCUMENTS

EP    1640876 A    3/2006

OTHER PUBLICATIONS

Moens, " Innovative techniques for legal text retrieval", Artificial Intelligence and Law 9: p. 29-57, 2001.*
Popov, B. et al. "Kim—Semantic Annotation Platform" In Proc. of Second International Semantic Web Conference, ISWC 2003, XP-002505186, Sanibel Island, FL, USA, Oct. 2003, pp. 834-849.

(Continued)

*Primary Examiner* — Amelia Tapp
(74) *Attorney, Agent, or Firm* — Cuenot, Forsythe & Kim, LLC (57) ABSTRACT

Text is intelligently annotated by first creating a topic map summarizing topics of interest of the user. A data structure is created. The topic map is used to create two linked user dictionaries, a topic dictionary reflecting topic names and a traversal dictionary reflecting the knowledge structure of a topic. Actions may be linked with topic types. When the text to be annotated is being read, the topic data structure of the topics found in the text are automatically instantiated using the dictionaries and any actions previously linked to topic types. Instantiated topic data structures are automatically attached to the text being annotated. A user GUI may be created to allow the user to access and interact with the text annotations.

14 Claims, 10 Drawing Sheets

(56) References Cited

OTHER PUBLICATIONS

Domingue, J. et al. "Collaborative Semantic Web Browsing with Magpie" In Proc. of First European Semantic Web Symposium, ESWS 2004, XP-002505185, Heraklion, Crete, Greece, May 2004, pp. 388-402.

Croke, P. et al. "Using Named Entities as a Basis to Share Associative Trails Between Semantic Desktops" In Proc. of the ISWC 2005 Workshop on the Semantic Desktop, 2005, XP-002505184, pp. 1-11.

Uren, V. et al. "Semantic Annotation for Knowledge Management: Requirements and a Survey of the State of the Art" Web Semantics: Science, Services and Agents on the World Wide Web, vol. 4, No. 1, XP-002505187, Nov. 17, 2005, pp. 14-28.

Casely-Hayford, L. "A Comparative Analysis of Methodologies, Tools and Languages Used for Building Ontologies", [Online] CCLRC Daresbury Laboratories, Swindon, XP-002505188, 2005, retrieved from the Internet: <http://epubs.cclrc.ac.uk/search?st=browse-by-person&pid=1345>, 24 pgs.

Faloutsos, C. "Access Methods for Text" ACM Computing Surveys, vol. 17, No. 1, XP-002505189, Mar. 1985, pp. 49-74.

"XML Topic Maps (XTM) 1.0" [online] TopicMaps.Org, © 2001 retrieved from the Internet: <http://www.topicmaps.org/xtm/1.01>, 64 pgs.

\* cited by examiner

INTELLIGENT TEXT ANNOTATION

BACKGROUND OF THE INVENTION

The present invention generally relates to the field of word processing and more particularly to intelligent annotation of text documents.

With word processors one can annotate text by underlining or highlighting parts of a text, writing text in the margin or in a text box anywhere in a document. This facilitates text interpretation. Furthermore, if a text annotation function is related to a semantic model, it can provide useful knowledge that helps users to better interpret the text and makes it easier for them to take quick actions. The accuracy of text-related applications such as text categorization, topic detection and document search can be enhanced.

Some applications include smart tag logic for identifying types of data, such as names, dates, or telephone numbers, and logic needed to provide one or more actions for each data type. The actions that can be taken depend on the type of data that is recognized and labeled with a smart tag. For example, if a "person name" is recognized in the text, actions that can be taken include opening a contact record, scheduling a meeting, adding the name to a contact list or inserting an address. If the user wants to add the name to a contact list, the corresponding application function for updating contact lists is started and the user can very quickly enter the information into an address book.

BRIEF SUMMARY OF THE INVENTION

The invention may be implemented as a method for annotating a text to be read by a user. A topic map is created based on topics of interest associated to the user. A data structure is created corresponding to a topic model for the user. The topic map is read. For each topic, topic information including a topic identifier and a knowledge structure is stored. The text to be annotated is read. For each topic found in the text, the stored topic information is retrieved and a topic data structure is created. Created topic data structures are attached to the text as annotations to corresponding topics found in the text.

The invention may also be implemented as a computer program product for annotating text to be read by a user. The computer program product includes a computer usable medium embodying computer usable program code. The computer usable program code is configured to create a topic map including topics of interest associated to the user, to read the topic map, to store topic information for each topic including a topic identifier and a knowledge structure, to read the text to be annotated, to retrieve stored topic information and create a topic data structure for each topic found in the text, and to attach the created topic data structures as annotations to corresponding topics found in the text.

The invention may also be implemented as a system for annotating a text to be read by a user. A topic map database stores topics of interest associated to the user. A logic subsystem creates a data structure corresponding to a topic model for the user. A first data reader reads the topic map. Data storage logic stores a topic identifier and a knowledge structure for each topic. A second data reader reads the text to be annotated. Data retrieval logic retrieves stored topic information and creates a topic data structure for each topic found in the text. Annotation logic attaches created topic data structures as annotations to corresponding topics found in the text.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
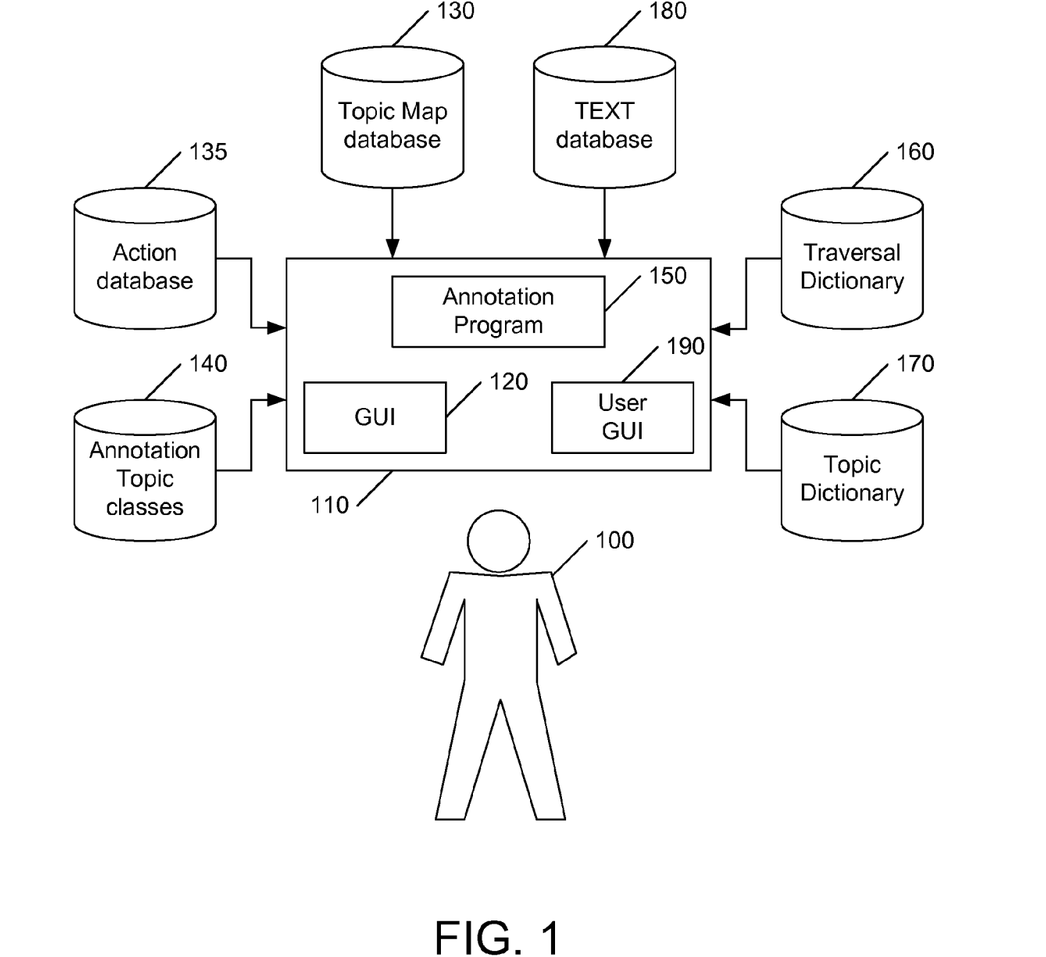
FIG. 1 illustrates the logical components of a system for annotating text according to one embodiment of the invention.

FIG. 1 illustrates the logical components of a system for annotating text according to one embodiment of the invention. Text can be annotated by a developer 100, such as a designer or program developer, working at a computer (110). The developer, working through a graphical user interface, creates a topic map in which the developer enters information related to specific interests of one or more users. This topic map orients the structure and the content of knowledge for topics of interest to the user which will be used in the text annotations for this user. The principle of the topic map is described in more detail later with reference to FIG. 2. A topic map database (130) is maintained to store previously created topic maps representing the interests of users. Annotator (150), a program or set of programs, is executed on the computer (110) to help the developer automatically execute some steps of the method for annotating text.

The developer first instructs the annotator program 150 to read a topic map and extract all the necessary information to create two dictionaries associated to the corresponding user, a topic dictionary (170) and a traversal dictionary (160). These dictionaries are described in more detail later with reference to FIGS. 3 and 4. In one embodiment of the invention, the text annotations may include actions associated to the topics of the text. In this case, the developer creates actions associated with the topics of the topic map and stores them in an action database (135). The action database 135 and the dictionaries are also part of the context of the user for creating text annotations. A context is associated to one user or to all users in a group of users having the same profile, such as members of a single department in a company. In creating annotations for a given text (retrieved from a TEXT database 180 for instance) the developer creates a data structure of the knowledge structure. This data structure may be an annotation topic class stored in a database (140) created in the UML language or any other modeling language. The developer can decide to create a class containing an 'action' object if actions are taken into account in creating the text annotations. Then the developer runs the annotator program (150), which identifies the topics of the text and, for each identified topic, automatically creates an instantiation of the topic class taking the information from the created dictionaries. If an action database (135) is used, the annotator links handlers to the actions of the instantiated topic class. The annotator program then creates the annotations in the text by attaching the instantiated classes to the corresponding topics found in the text. The developer then creates a GUI (the User GUI 190) that will allow a user reading the annotated text to access the annotations in a logical way, through menus for instance.

Given a standard structure of topic maps, a generic user GUI may be developed for all the texts generally available to all users. However, the developer may customize a User GUI for a particular user or for a specific text to be made available to users.

It is noted that the annotator program 150 is a program that helps create annotations for texts associated to any user or user group. As a matter of fact, the annotator program is preferably able to read any ISO standard topic map and any topic object class written in any specified modeling language.

Even if the developer changes the modeling language for describing topic classes, once the classes are defined the same annotator program can be used to instantiate the classes and include annotations in texts.

Figure 2:
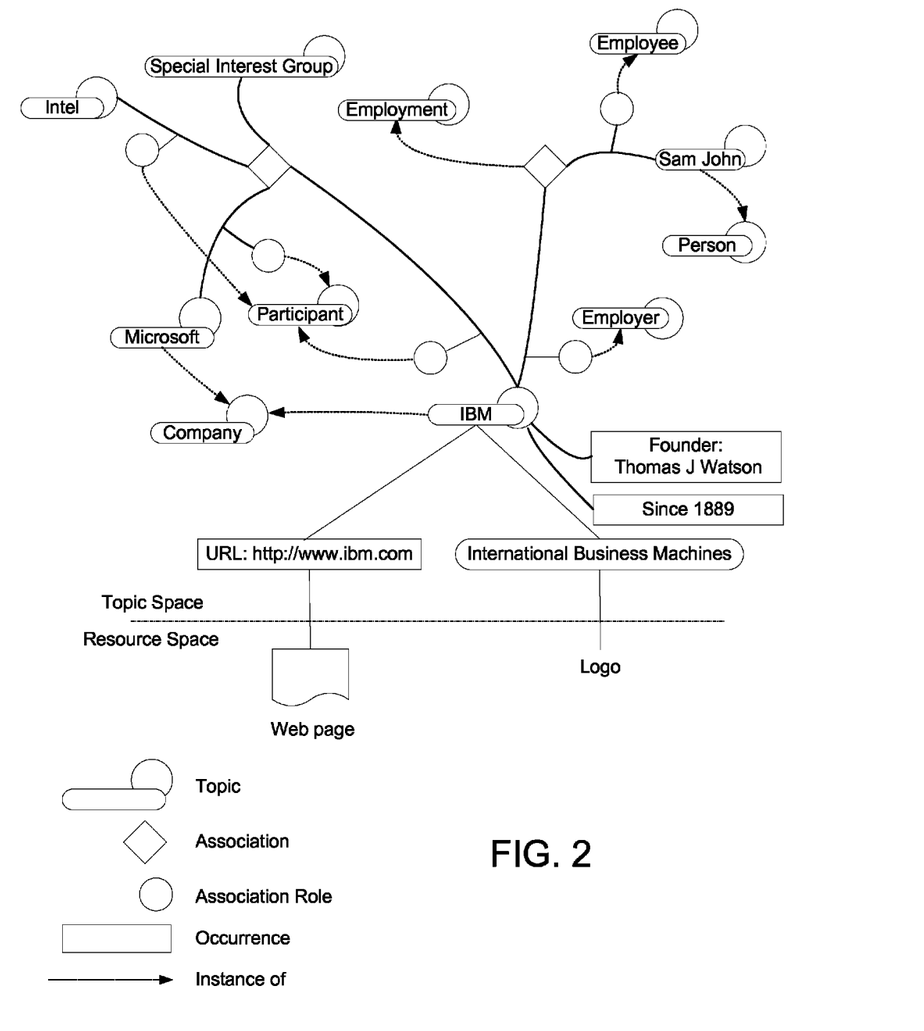
FIG. 2 is an example of a topic map built by a designer in relation to user context preparation according to one embodiment of the invention.

FIG. 2 is an example of topic map built by a developer in relation to user context preparation according to one embodiment of the invention. Topic maps are defined by a new ISO standard for describing knowledge structures and associating them with information resources, therefore enabling the structuring of unstructured information. More information about topic maps is available on the World Wide Web at www.topicmaps.org/xtm/1.0/.

A topic map contains a body of knowledge and consists of a collection of topics, each of which represents certain concepts. Topics are related to each other by associations, which are typed n-ary combinations of topics. A topic may also be related to any number of resources by its occurrences as shown in FIG. 2. Since topic maps define a good model for knowledge semantic structuring, the use of topic maps facilitates intelligent annotation of texts.

The topic map of FIG. 2 illustrates the interests and relationship of an employee of International Business Machines Corporation working with other companies such as Microsoft and Intel and participating in special interest groups in specific technical domains. The topic map of FIG. 2 includes topics relating to the employee's hierarchy in the company and to the employee's professional relationships outside the company.

Figure 3:
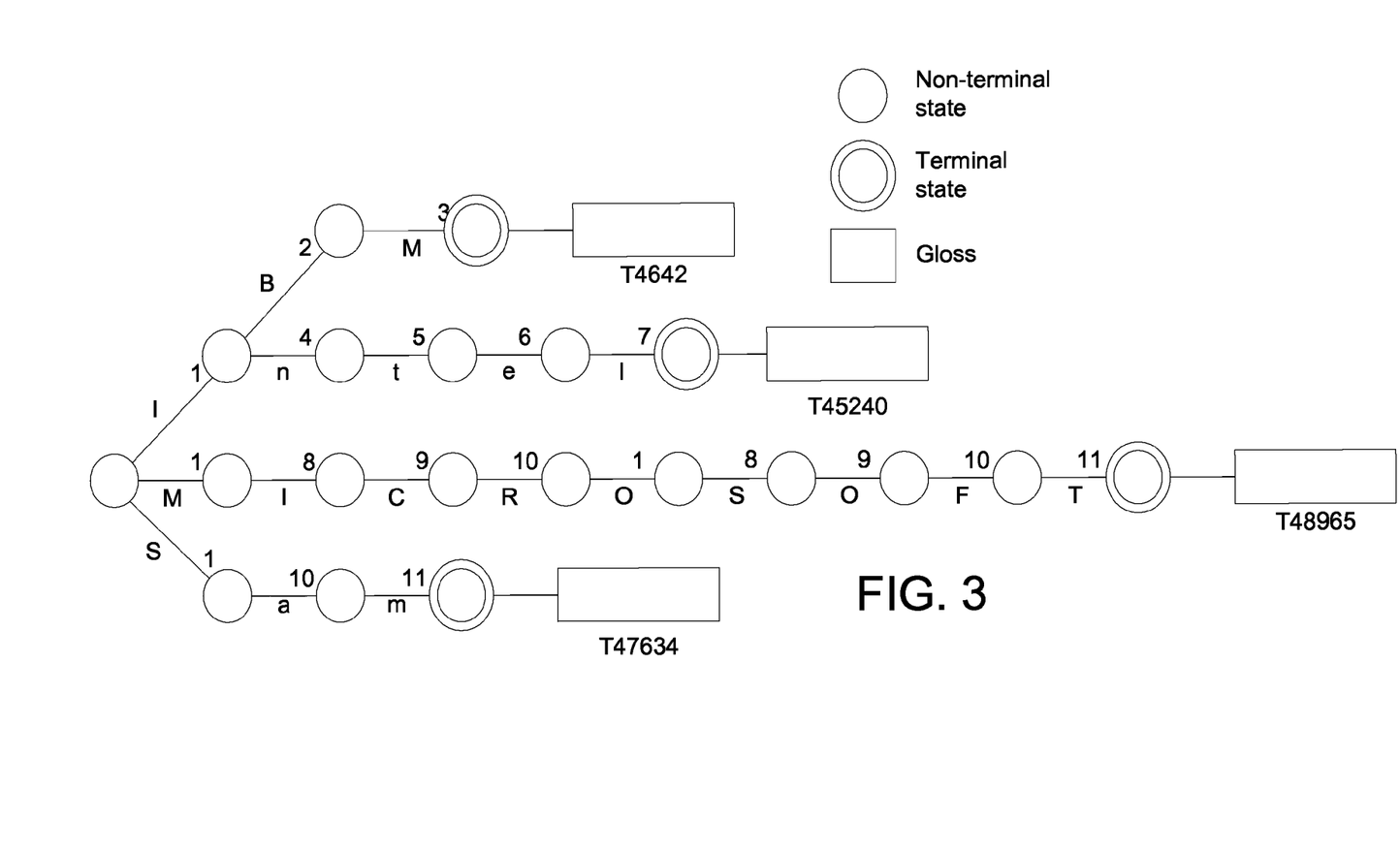
FIG. 3 is a sample of a FSA (Finite State Automata)-based topic dictionary according to one embodiment of the invention.

FIG. 3 is a sample of a FSA-based topic dictionary that is part of the user context preparation. A topic dictionary is used to discover topics in texts. The annotator automatically builds the topic dictionary of a user using as input a topic map associated to the user. FIG. 3 describes one entry of the topic dictionary which contains a key (a sequence of characters) and a set of attributes associated with the key. These attributes are separated into logical groups. Each group of attributes (called a "Gloss") contains a specific type of information.

The dictionaries in the preferred embodiment are FSA-based, where keys are represented in the dictionary using a Finite State Automaton and Glosses are attached to terminal nodes in the FSA. In this way, dictionary lookup can be performed rapidly by the annotator program. Given a topic map (selected by the user or constructed by or specifically for the user), that represents a body of knowledge that interests the user, the two associated dictionaries are generated for the purpose of detecting entities (topics) in text documents and retrieving knowledge structures represented in the topic map related to that topic.

Figure 4:
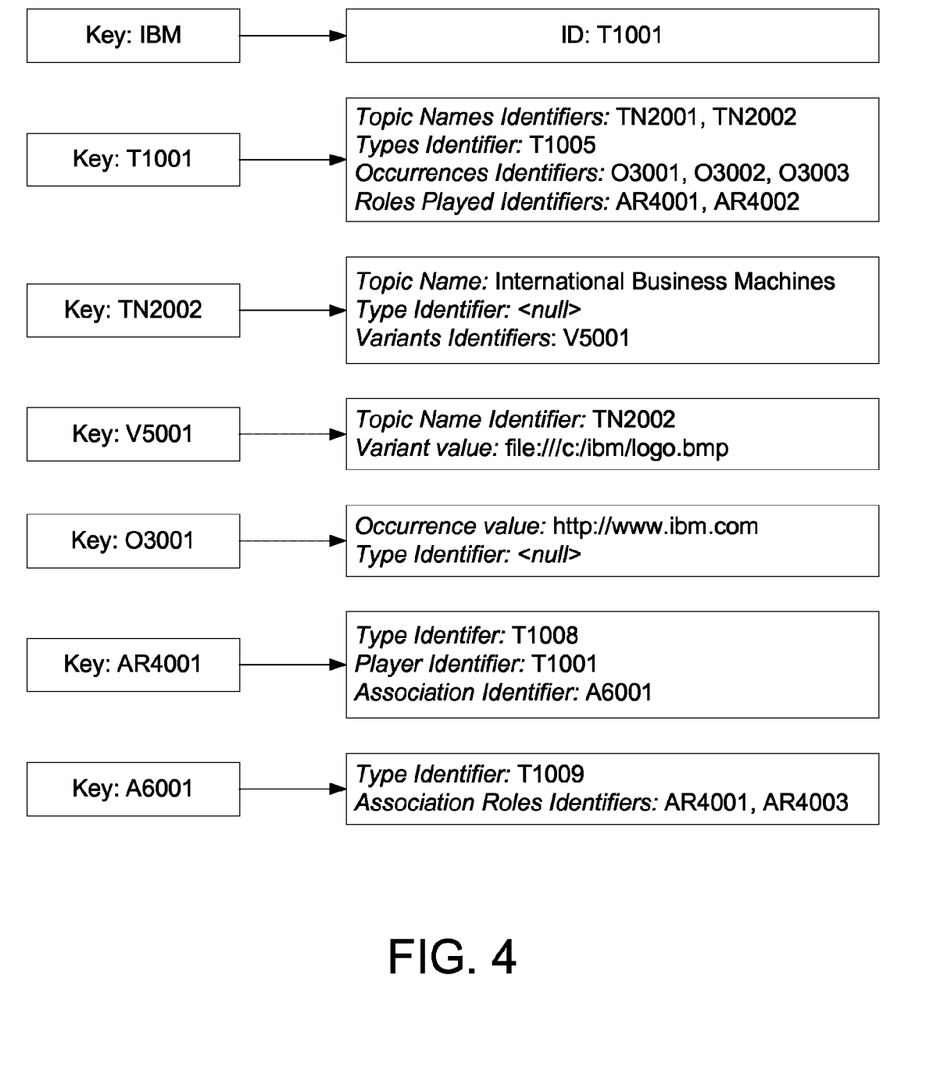
FIG. 4 illustrates entries in a topic dictionary and its associated traversal dictionary according to one embodiment of the invention.

FIG. 4 illustrates entries in a topic dictionary and a traversal dictionary according to one embodiment of the invention.

Keys of the topic dictionary are topic names. The value (gloss) associated with a key is the topic identifier associated with that key (topic name). For example, with a dictionary that contains the first entry (400) in FIG. 4, when processing a text containing the word "IBM", the dictionary will detect this word and return the identifier for the topic with that name.

The traversal dictionary is used to retrieve the knowledge structure related to a given topic. When building this dictionary, a property of topic maps was considered which states that each topic map construct (e.g. Topics, Topic Names, Occurrences, Associations . . . , etc.) must have an identifier that is unique across the Map. A key in that dictionary is an identifier for a construct. The glosses associated with a key contain the information for that construct. A number of gloss types are defined for a traversal dictionary to hold information related to topic maps:

Topic gloss: A topic gloss (410) contains

Topic Names Identifiers—used to retrieve the names for that topic,

Types Identifiers—used to retrieve the types (classes) for that topic,

Occurrences Identifiers—used to retrieve the occurrences for that topic,

Roles Played Identifiers—used to retrieve the associations that the topic is participating in along with its roles.

Topic Name gloss: A topic Name gloss (420) contains

Topic Name—the value of the topic name,

Type Identifier—used to retrieve the type (class) for that topic name,

Variants Identifiers—used to retrieve variant forms for that topic name.

Variant gloss: A variant gloss (430) contains

Topic Name Identifier—refers to the topic name having this variant,

Variant value—the value of this variant form for the topic name.

Occurrence gloss: An occurrence gloss (440) contains

Occurrence value—the value of the occurrence, which can be a URI or a string for simple properties, Type Identifier—used to retrieve the type (class) for that occurrence.

Association Role gloss: An association role gloss (450) contains

Type Identifier—used to retrieve the type (class) for that role,

Player Identifier—refers to the topic that played that role,

Association Identifier—used to retrieve the association that the player topic is participating in.

Association gloss: An association gloss (460) contains

Type Identifier—used to retrieve the type (class) for that association,

Association Roles Identifiers—used to retrieve the participants in this association along with their roles.

Although not specifically shown in FIG. 4, the entry in an Action database (135) consists of an action name associated to a topic type, the topic type being an attribute of the topic object of a topic class.

Figure 5:
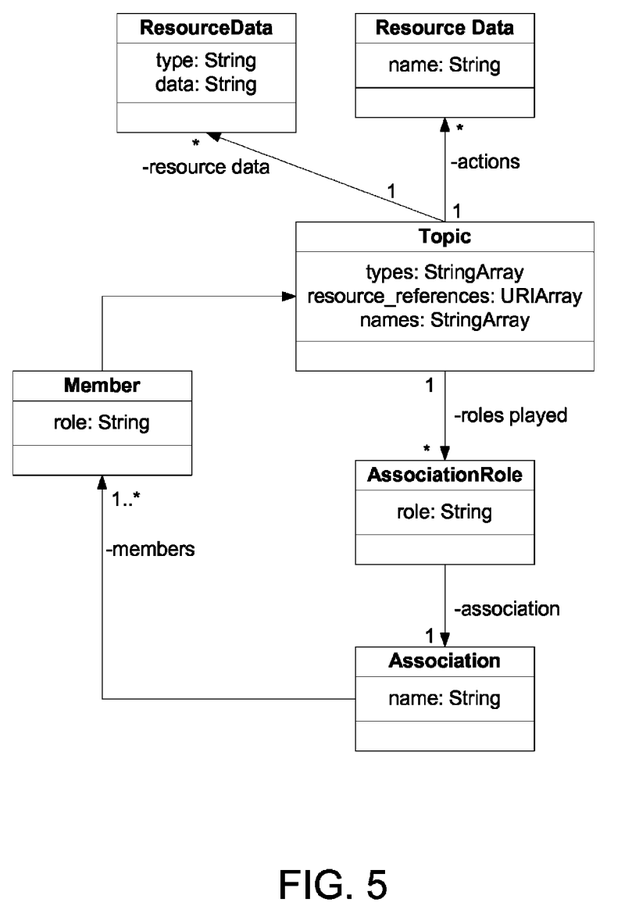
FIG. 5 is a topic annotation class described in UML (Unified Modeling Language) according to one embodiment of the invention.

FIG. 5 illustrates a topic annotation class described in UML according to an embodiment of the invention. In order to capture the nature of topic maps structure which permits topics to be related to other topics through "associations", a data structure is created by the developer that allows a dynamic expansion recursively filled with topic map knowledge items. This expansion can accommodate other topic knowledge items related to other topics in association with the original topic.

In the example of FIG. 5, actions are taken into account as one topic object is related to one action object, the relation being one to many.

Figure 6:
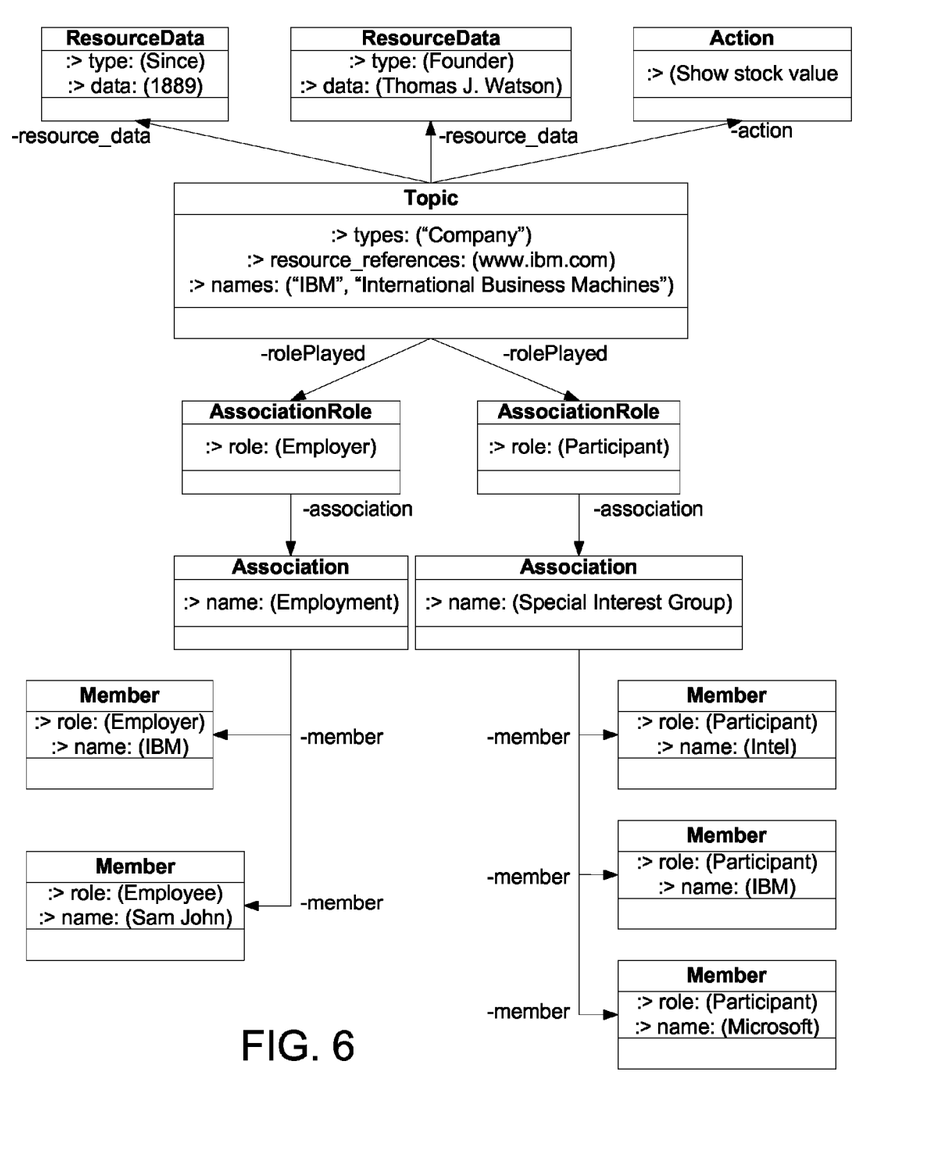
FIG. 6 illustrates an instantiated topic annotation class using the content of dictionaries and action database.

FIG. 6 describes an instantiated topic annotation class using the content of dictionaries and action database (135). The annotator program automatically instantiates the topic classes for each topic identified in the text by reading the dictionaries whose entries have been described above with respect to FIG. 4 and by reading actions associated with the topic types from the Action database (135). The step for instantiating the classes according to the topics successively identified in the text is described in detail later with reference to FIG. 9.

The instantiated class of FIG. 6 corresponds to the class shown in FIG. 5. For instance, according to the topic type value, only one action has been related to the topic. This information has been read from action database.

Figure 7:
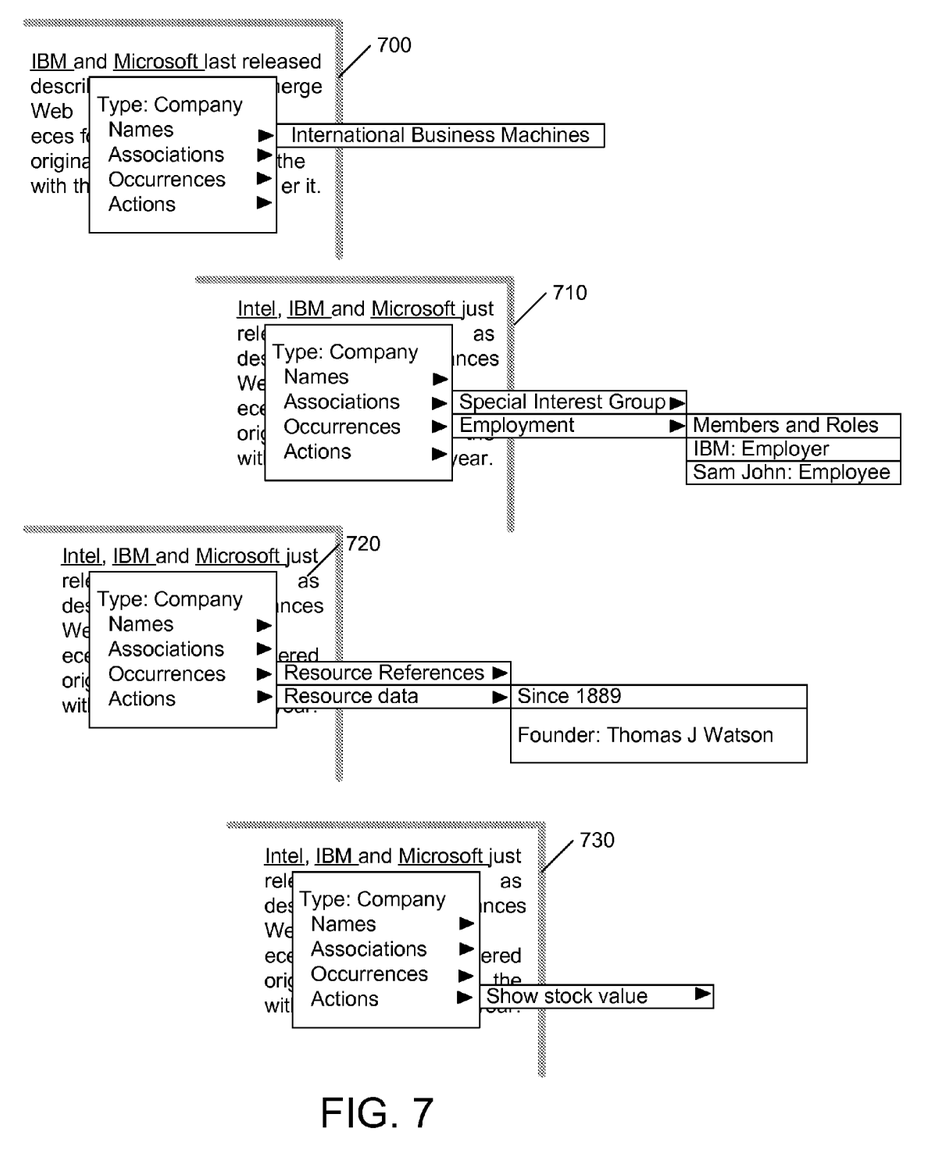
FIG. 7 illustrates text annotations generated according to one embodiment of the invention.

FIG. 7 illustrates generated text annotations visible to a user according to one embodiment. The developer has created a User GUI to display the topic-embedded knowledge. The user can interact with the annotated text in the following way. When the user moves a pointer over an annotated token in the text (underlined in FIG. 7), 'the topic type' is fetched from the instantiated 'Topic Annotation Data structure' and displayed above the text by the application. If the user clicks on the annotated token, a menu containing the topic names, topic associations, topic occurrences and associated actions that were stored in the topic dictionary is displayed. The user can select an item from this menu and cascaded menus will be displayed, containing the items fetched from the instantiated 'Topic Annotation Data Structure' (which is linked to the identified topic), according to the user selection and interests. FIG. 7 illustrates possible interests, Names 700, Associations 710 or Occurrences 720), thereby providing the user with comprehensive knowledge related to the annotated token in the text. If the user decides to select a related action for the topic identified in the text, the associated action handler immediately executes a command (e.g. send an e-mail, or 'Show stock value' in 730).

Figure 10:
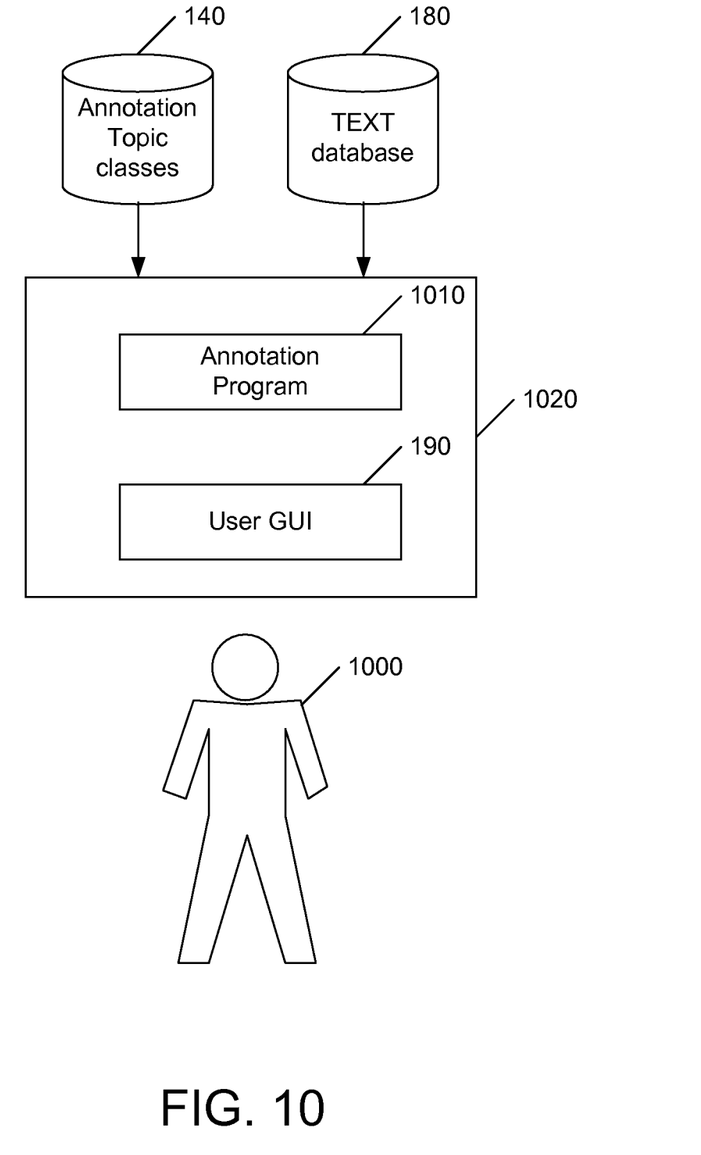
FIG. 10 illustrates the logical components of a system that allows a user to access text annotations created according to one embodiment of the invention.

FIG. 10 illustrates the logical components of a system used by a user (1000) reading the annotated text. To be able to access and interact with text annotations created using one embodiment of the invention, the user (1000) starts the User GUI (190) which may, for instance, be an interface to a preferred editor (1010) on workstation (1020). The User GUI accesses the text in the TEXT Database (180) and accesses the instantiated topic classes stored by the annotator in the annotation topic classes database (140). The User GUI displays the menus providing access to the knowledge related to the topics of the text.

Figure 8:
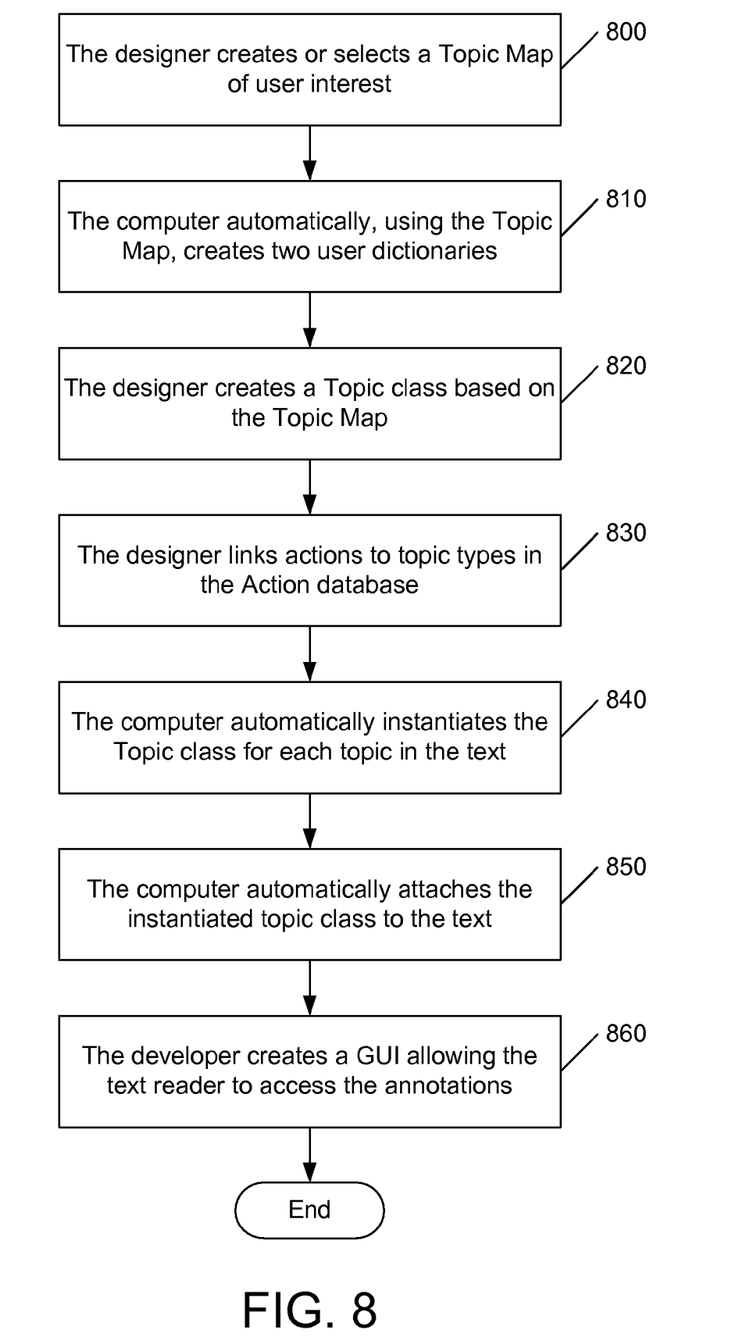
FIG. 8 is a general flowchart of an implementation of one embodiment of the invention.

FIG. 8 is a flowchart of the general method for creating annotated texts according to one embodiment of the present invention. Steps in the flowchart that are not automatically executed by the annotator program may be executed by a designer (for example, steps 800, 820, 830) or a 'developer' (for example, step 860) who has competence in designing the applications of steps (800, 820, 830). Most of the time the same person act as either the developer or the designer.

The designer creates (800) a topic map of user interests. As already mentioned before, the topic maps contain a body of knowledge that may be of interest to a user and defines a model for knowledge semantic structuring. The topic map can be stored in a topic map database (130). This step is preferably performed through a Graphical User Interface (120) running on the designer's workstation.

The designer starts the execution of the annotator program (150) which automatically transforms (810) the topic map into dictionaries. The knowledge represented in the topic map is transformed into the two associated dictionaries, the topic dictionary and the traversal dictionary, described earlier.

The designer creates a topic class (820) using an object modeling language such as UML. The topic class captures the nature of the topic map structure which permits topics to be related to other topics through 'associations'.

If the designer has defined an 'action' object related to a topic in the topic class, the designer links (830) actions to topic types and stores them in action database (135). This means that an action may be associated to different topics having the same type.

The designer starts the execution of the annotator program, which automatically instantiates (840) the topic class created in the previous step for each topic identified in a text to be annotated. The topic class data structure allows dynamic expansion when recursively filled in this step with topic map knowledge items stored in the topic dictionary and the traversal dictionary and, optionally, the action database (135). This step is described in more detail with reference to FIG. 9.

The annotator program automatically attaches (850) the corresponding instantiated classes to the topic names identified in the text. The annotator may store the text which has been so modified in the TEXT database 180.

The developer creates a GUI for the user (860), the USER GUI, which allows the user when reading the annotated text on the user's computer to display annotations in a logical way, preferably with menus as illustrated in FIG. 7. Using this User GUI, the user will interact with the annotated text, will navigate the knowledge associated with it, and will make use of the embedded knowledge linked to it to interpret the text. If actions are part of the knowledge, the user may take quick informed actions, by simply pointing and clicking on annotated tokens in the text.

Figure 9:
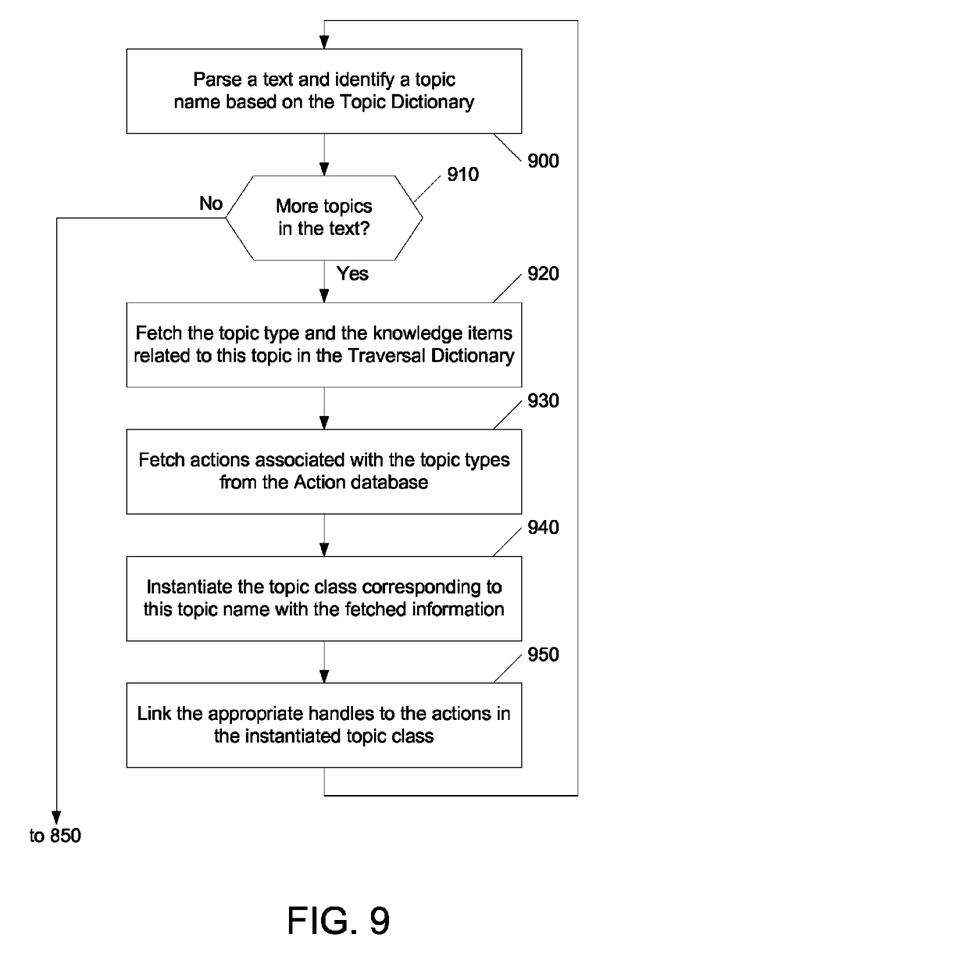
FIG. 9 is a flowchart of the instantiation of topic annotation classes according to one embodiment of the invention

FIG. 9 is the flowchart of a step generally illustrated in FIG. 8, describing the instantiation of topic annotation classes (840) according to one embodiment of the invention. The annotator program parses (900) the text and performs a lookup in the topic dictionary for every parsed token. If a token is found in the topic dictionary, then a topic name is identified and its topic identifier is retrieved using the topic dictionary. A lookup for the topic identifier is performed in the traversal dictionary and its associated glosses are retrieved. Based on the identifiers extracted from these glosses, the annotator program performs a series of successive lookups in the traversal dictionary (920) to retrieve the information related to the knowledge structure of the topic, and then uses it to instantiate (930) the annotation topic class (or, more generally, to fill the annotation topic data structure).

Then, if the option of supporting actions in the text annotations has been selected, the annotator fetches the actions associated with the topic type from the action database (925) to instantiate the actions in the annotation topic class (930). Finally, the annotator program links (935) a handler to each action of the instantiated annotation topic class to complete this instantiation. The instantiated annotation topic classes are preferably stored in the annotation topic class database (140). The handlers start execution of existing or new programs on the computer when the user accesses, through the User GUI, the actions which are associated with a topic in the annotation displayed when the annotated text is read.

Step 840 is completed when all the tokens for the text have been identified (answer No to test 910) and all the annotation topic classes have been instantiated.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for annotating a text to be read by a user, said method comprising creating a topic map comprising topics of interest associated to the user;
   creating a data structure corresponding to a topic model for the user;
   reading the topic map;
   for each topic, storing topic information comprising a topic identifier and a knowledge structure;
   reading the text to be annotated to identify occurrences of topics of interest associated to the user;
   for each topic found in the text, retrieving the stored topic information and creating a topic data structure;
   attaching created topic data structures to the text as annotations to corresponding topics found in the text; and
   creating a graphical user interface to the text, allowing the user to access the text annotations when reading the text on a display device.

2. The method of claim 1 further comprising:
   after creating the topic map, linking actions with topics and storing the actions;
   including actions in the created topic data structure;
   retrieving the stored actions linked to a topic; and
   linking a handler to each action.

3. The method of claim 2 wherein storing topic information further comprises storing topic identifiers in a topic dictionary, and storing the topic knowledge structure in a traversal dictionary and retrieving topic information further comprises reading the topic dictionary and the traversal dictionary.

4. The method of claim 3 wherein storing topic information further comprises storing topic identifiers in FSA-based dictionaries, and retrieving topic information further comprises reading the FSA-based dictionaries.

5. The method of claim 4 wherein creating a topic data structure further comprises creating a topic class using an object model language, and creating a topic data structure for each topic found in the text further comprises instantiating a topic class for each topic found in the text.

6. A computer program product for annotating a text to be read by a user, said computer program product comprising
   a computer usable storage device having computer usable program code embodied therewith, said computer usable program code comprising:
   computer usable program code configured to create a topic map comprising topics of interest associated to the user;
   computer usable program code configured to create a data structure corresponding to a topic model for the user;
   computer usable program code configured to read the topic map;
   computer usable program code configured to, for each topic, store topic information comprising a topic identifier and a knowledge structure;

computer usable program code configured to read the text to be annotated to identify occurrences of topics of interest associated to the user;

computer usable program code configured to, for each topic found in the text, retrieve the stored topic information and creating a topic data structure;

computer usable program code configured to attach the created topic data structures as annotations to corresponding topics found in the text; and computer usable program code configured to create an interface to the text, allowing the user to access the text annotations when reading the text on a display device, wherein the computer usable storage device does not consist of a transitory, propagating signal.

7. The computer program product of 6 further comprising:

computer usable program code configured to, after creating the topic map, to link actions with topics and to store the actions;

computer usable program code configured to include actions in the created topic data structure;

computer usable program code configured to retrieve the stored actions linked to a topic; and computer usable program code configured to link a handler to each action.

8. The computer program product of claim 7 wherein the computer usable program code configured to store topic information further comprises computer usable program code configured to store topic identifiers in a topic dictionary, and the computer usable program code configured to store the topic knowledge structure in a traversal dictionary and retrieve topic information further comprises computer usable program code configured to read the topic dictionary and the traversal dictionary.

9. The computer program product of claim 8 wherein the computer usable program code configured to store topic information further comprises computer usable program code configured to store topic identifiers in FSA-based dictionaries, and the computer usable program code configured to retrieve topic information further comprises computer usable program code configured to read the FSA-based dictionaries.

10. The computer program product of claim 9 wherein the computer usable program code configured to create a topic data structure further comprises creating a topic class using an object model language, and the computer usable program code configured to create a topic data structure for each topic found in the text further comprises computer usable program code configured to instantiate a topic class for each topic found in the text.

11. A computer-implemented system for annotating a text to be read by a user, said system comprising:

a processor;

a topic map database for storing topics of interest associated to the user;

a logic subsystem for creating a data structure corresponding to a topic model for the user;

a first data reader for reading the topic map;

data storage logic for storing topic information about each topic in said database, the stored information comprising a topic identifier and a knowledge structure;

a second data reader for reading the text to be annotated to identify occurrences of topics of interest associated to the user;

data retrieval logic for retrieving the stored topic information from said database and creating a topic data structure for each topic found in the text;

annotation logic for attaching created topic data structures as annotations to the text to corresponding topics found in the text; and a GUI building subsystem for creating a graphical user interface to the text allowing the user to access the text annotations when reading the text on a display device.

12. The computer-implemented system of claim 11 further comprising action handling logic for after creating the topic map, linking actions with topics and storing the actions in said database;

including actions in the created topic data structure;

retrieving the stored actions linked to a topic; and linking a handler to each action.

13. The computer-implemented system of claim 12 further comprising:

a topic dictionary for storing topic identifiers; and a traversal dictionary for storing the topic knowledge.

14. The computer-implemented system of claim 13 wherein said topic dictionary further comprises an FSA-based dictionary.

* * * * *